(12) United States Patent
Thorstensen-Woll (10) Patent No.: US 12,377,630 B2
(45) Date of Patent: Aug. 5, 2025

(54) DISPENSING LINER

(71) Applicant: Selig Sealing Products, Inc., Forrest, IL (US)

(72) Inventor: Robert William Thorstensen-Woll, Barrie (CA)

(73) Assignee: Selig Sealing Products, Inc., Forrest, IL (US)

( * ) Notice: Subject to any disclaimer, the term of this patent is extended or adjusted under 35 U.S.C. 154(b) by 25 days.

(21) Appl. No.: 17/924,172

(22) PCT Filed: May 14, 2021

(86) PCT No.: PCT/US2021/032390
§ 371 (c)(1),
(2) Date: Nov. 9, 2022

(87) PCT Pub. No.: WO2021/242540
PCT Pub. Date: Dec. 2, 2021

(65) Prior Publication Data
US 2023/0226797 A1 Jul. 20, 2023

Related U.S. Application Data

(60) Provisional application No. 63/031,818, filed on May 29, 2020.

(51) Int. Cl.
*B32B 7/06* (2019.01)
*B32B 3/04* (2006.01)
(Continued)

(52) U.S. Cl.
CPC ............. *B32B 3/266* (2013.01); *B32B 3/04* (2013.01); *B32B 3/08* (2013.01); *B32B 3/30* (2013.01);
(Continued)

(58) Field of Classification Search
CPC .. B32B 3/266; B32B 3/04; B32B 3/08; B32B 3/30; B32B 5/18; B32B 27/306;
(Continued)

(56) References Cited

U.S. PATENT DOCUMENTS 1,818,379 A   8/1931  Cain
2,768,762 A  10/1956  Guinet
(Continued)

FOREIGN PATENT DOCUMENTS

AT       501393 A1    8/2006
AT        11738 U1    4/2011
(Continued)

OTHER PUBLICATIONS

Patent Cooperation Treaty, International Search Report dated Aug. 17, 2021 for International Application No. PCT/US2021/032390 (2 pages).
(Continued)

*Primary Examiner* — Maria V Ewald
*Assistant Examiner* — Daniel P Dillon
(74) *Attorney, Agent, or Firm* — Fitch, Even, Tabin & Flannery, LLP (57) ABSTRACT

Various systems are provided herein for sealing and dispensing the contents of containers. The systems can include openings that may be movable relative to one another between sealed positions and dispensing positions.

17 Claims, 5 Drawing Sheets

(51) Int. Cl.

| | | |
|---|---|---|
| *B32B 3/08* | (2006.01) | |
| *B32B 3/26* | (2006.01) | |
| *B32B 3/30* | (2006.01) | |
| *B32B 5/18* | (2006.01) | |
| *B32B 27/30* | (2006.01) | |
| *B32B 27/32* | (2006.01) | |
| *B65D 53/04* | (2006.01) | |
| *B65D 77/20* | (2006.01) | |
| B32B 15/082 | (2006.01) | |
| B32B 15/085 | (2006.01) | |
| B32B 15/088 | (2006.01) | |
| B32B 15/09 | (2006.01) | |
| B32B 15/12 | (2006.01) | |
| B32B 15/20 | (2006.01) | |
| B32B 27/08 | (2006.01) | |
| B32B 27/34 | (2006.01) | |
| B32B 27/36 | (2006.01) | |
| B32B 29/08 | (2006.01) | |

(52) U.S. Cl.
CPC ............. *B32B 5/18* (2013.01); *B32B 27/306* (2013.01); *B32B 27/32* (2013.01); *B65D 53/04* (2013.01); *B65D 77/206* (2013.01); B32B 15/082 (2013.01); B32B 15/085 (2013.01); B32B 15/088 (2013.01); B32B 15/09 (2013.01); B32B 15/12 (2013.01); B32B 15/20 (2013.01); B32B 27/08 (2013.01); B32B 27/322 (2013.01); B32B 27/34 (2013.01); B32B 27/36 (2013.01); B32B 29/08 (2013.01); B32B 2255/10 (2013.01); B32B 2255/26 (2013.01); B32B 2266/025 (2013.01); B32B 2270/00 (2013.01); B32B 2307/31 (2013.01); B32B 2307/5825 (2013.01); B32B 2307/7244 (2013.01); B32B 2307/7246 (2013.01); B32B 2307/7376 (2023.05); B32B 2435/02 (2013.01)

(58) Field of Classification Search
CPC ..... B32B 27/32; B32B 15/082; B32B 15/085; B32B 15/088; B32B 15/09; B32B 15/12; B32B 15/20; B32B 27/08; B32B 27/322; B32B 27/34; B32B 27/36; B32B 29/08; B32B 2255/10; B32B 2255/26; B32B 2266/025; B32B 2270/00; B32B 2307/31; B32B 2307/5825; B32B 2307/7246; B32B 2307/7376; B32B 2435/02; B32B 7/06; B32B 27/065; B32B 2307/20; B32B 7/20; B32B 7/05; B32B 29/00; B32B 2307/748; B32B 2307/732; B32B 7/12; B32B 27/308; B65D 53/04; B65D 77/206
USPC ........................................................ 428/131
See application file for complete search history.

(56) References Cited

U.S. PATENT DOCUMENTS

| | | |
|---|---|---|
| 3,235,165 A | 2/1966 | Jackson |
| 3,292,828 A | 12/1966 | Stuart |
| 3,302,818 A | 2/1967 | Balocca et al. |
| 3,460,310 A | 8/1969 | Adcock et al. |
| 3,556,816 A | 1/1971 | Nughes |
| 3,964,670 A | 6/1976 | Amneus |
| 3,990,603 A | 11/1976 | Brochman |
| 4,022,324 A | 5/1977 | Schuster |
| 4,133,796 A | 1/1979 | Bullman |
| 4,206,165 A | 6/1980 | Dukess |
| 4,266,687 A | 5/1981 | Cummings |
| 4,396,655 A | 8/1983 | Graham |
| 4,556,590 A | 12/1985 | Martin |
| 4,582,735 A | 4/1986 | Smith |
| 4,588,099 A | 5/1986 | Diez |
| 4,595,116 A | 6/1986 | Carlsson |
| 4,596,338 A | 6/1986 | Yousif |
| 4,636,273 A | 1/1987 | Wolfersperger |
| 4,666,052 A | 5/1987 | Ou-Yang |
| 4,693,390 A | 9/1987 | Hekal |
| 4,735,335 A | 4/1988 | Torterotot |
| 4,741,791 A | 5/1988 | Howard |
| 4,762,246 A | 8/1988 | Ashley |
| 4,770,325 A | 9/1988 | Gordon |
| 4,771,903 A | 9/1988 | Levene |
| 4,781,294 A | 11/1988 | Croce |
| 4,784,885 A | 11/1988 | Carespodi |
| 4,801,647 A | 1/1989 | Wolfe, Jr. |
| 4,811,856 A | 3/1989 | Fischman |
| 4,818,577 A | 4/1989 | Ou-Yang |
| 4,837,061 A | 6/1989 | Smits |
| 4,863,061 A | 9/1989 | Moore |
| 4,867,881 A | 9/1989 | Kinzer |
| 4,889,731 A | 12/1989 | Williams |
| 4,917,949 A | 4/1990 | Yousif |
| 4,934,544 A | 6/1990 | Han |
| 4,938,390 A | 7/1990 | Markva |
| 4,960,216 A | 10/1990 | Giles |
| 4,961,986 A | 10/1990 | Galda |
| 5,004,111 A | 4/1991 | Mccarthy |
| 5,012,946 A | 5/1991 | Mccarthy |
| 5,015,318 A | 5/1991 | Smits |
| 5,053,457 A | 10/1991 | Lee |
| 5,055,150 A | 10/1991 | Rosenfeld |
| 5,057,365 A | 10/1991 | Finkelstein |
| 5,071,710 A | 12/1991 | Smits |
| 5,089,320 A | 2/1992 | Straus |
| 5,098,495 A | 3/1992 | Smits |
| RE33,893 E | 4/1992 | Elias |
| 5,106,124 A | 4/1992 | Volkman |
| 5,125,529 A | 6/1992 | Torterotot |
| 5,131,556 A | 7/1992 | Iioka |
| 5,149,386 A | 9/1992 | Smits |
| 5,178,967 A | 1/1993 | Rosenfeld |
| 5,197,618 A | 3/1993 | Goth |
| 5,217,790 A | 6/1993 | Galda |
| 5,226,281 A | 7/1993 | Han |
| 5,261,990 A | 11/1993 | Galda |
| 5,265,745 A | 11/1993 | Pereyra |
| 5,433,992 A | 7/1995 | Galda |
| 5,513,781 A * | 5/1996 | Ullrich .................. B65D 83/06 215/347 |
| 5,514,442 A | 5/1996 | Galda |
| 5,560,989 A | 10/1996 | Han |
| 5,598,940 A | 2/1997 | Finkelstein |
| 5,601,200 A | 2/1997 | Finkelstein |
| 5,615,789 A | 4/1997 | Finkelstein |
| 5,618,618 A | 4/1997 | Murschall |
| 5,669,521 A | 9/1997 | Wiening |
| 5,683,774 A | 11/1997 | Faykish |
| 5,702,015 A | 12/1997 | Giles |
| 5,709,310 A | 1/1998 | Kretz |
| 5,720,401 A | 2/1998 | Moore |
| 5,759,650 A | 6/1998 | Raines |
| 5,776,284 A | 7/1998 | Sykes |
| 5,851,333 A | 12/1998 | Fagnant |
| 5,860,544 A | 1/1999 | Brucker |
| 5,871,112 A | 2/1999 | Giles |
| 5,887,747 A | 3/1999 | Burklin |
| 5,915,577 A | 6/1999 | Levine |
| 5,975,304 A | 11/1999 | Cain |
| 5,976,294 A | 11/1999 | Fagnant |
| 6,056,141 A | 5/2000 | Navarini |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,234,386 B1 | 5/2001 | Drummond |
| 6,290,801 B1 | 9/2001 | Krampe |
| 6,312,776 B1 | 11/2001 | Finkelstein |

(56) References Cited

U.S. PATENT DOCUMENTS

| | | |
|---|---|---|
| 6,361,856 B1 | 3/2002 | Wakai |
| 6,378,715 B1 | 4/2002 | Finkelstein |
| 6,458,302 B1 | 10/2002 | Shifflet |
| 6,461,714 B1 | 10/2002 | Giles |
| 6,544,615 B2 | 4/2003 | Otten |
| 6,548,302 B1 | 4/2003 | Mao |
| 6,602,309 B2 | 8/2003 | Vizulis |
| 6,627,273 B2 | 9/2003 | Wolf |
| 6,635,137 B2 | 10/2003 | Giles |
| 6,669,046 B1 | 12/2003 | Sawada |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko |
| 6,902,075 B2 | 6/2005 | Obrien |
| 6,916,516 B1 | 7/2005 | Gerber |
| 6,955,736 B2 | 10/2005 | Rosenberger |
| 6,959,832 B1 | 11/2005 | Sawada |
| 6,974,045 B1 | 12/2005 | Trombach |
| 6,986,930 B2 | 1/2006 | Giles |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,731,048 B2 | 6/2010 | Teixeira Alvares |
| 7,740,730 B2 | 6/2010 | Schedl |
| 7,740,927 B2 | 6/2010 | Yousif |
| 7,757,879 B2 | 7/2010 | Schuetz |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Woll |
| 8,025,171 B2 | 9/2011 | Cassol |
| 8,057,896 B2 | 11/2011 | Smelko |
| 8,129,009 B2 | 3/2012 | Morris |
| 8,201,385 B2 | 6/2012 | Mclean |
| 8,308,003 B2 | 11/2012 | O'brien |
| 8,329,288 B2 | 12/2012 | Allegaert |
| 8,348,082 B2 | 1/2013 | Cain |
| 8,455,071 B2 | 6/2013 | Lo |
| 8,541,081 B1 | 9/2013 | Ranganathan |
| 8,703,265 B2 | 4/2014 | Thorstensen-Woll |
| 8,715,825 B2 | 5/2014 | Thorstensen-Woll |
| 8,852,725 B2 | 10/2014 | Sachs |
| 8,906,185 B2 | 12/2014 | Mclean |
| 8,944,264 B2 | 2/2015 | Frishman |
| 9,028,963 B2 | 5/2015 | Thorstensen-Woll |
| 9,102,438 B2 | 8/2015 | Thorstensen-Woll |
| 9,120,289 B2 | 9/2015 | Chang |
| 9,132,947 B2 | 9/2015 | Wiening |
| 9,193,513 B2 | 11/2015 | Thorstensen-Woll |
| 9,221,579 B2 | 12/2015 | Thorstensen-Woll |
| 9,227,755 B2 | 1/2016 | Thorstensen-Woll |
| 9,278,506 B2 | 3/2016 | Mclean |
| 9,278,793 B2 | 3/2016 | Thorstensen-Woll |
| 9,440,765 B2 | 9/2016 | Thorstensen-Woll |
| 9,440,766 B2 | 9/2016 | Wiening |
| 9,440,768 B2 | 9/2016 | Thorstensen-Woll |
| 9,533,805 B2 | 1/2017 | Mclean |
| 9,637,288 B2 | 5/2017 | Abegglen |
| 9,676,513 B2 | 6/2017 | Thorstensen-Woll |
| 9,834,339 B2 | 12/2017 | Brucker |
| 9,908,658 B2 | 3/2018 | Jouin |
| 9,956,741 B2 | 5/2018 | Planchard |
| 9,994,357 B2 | 6/2018 | Thorstensen-Woll |
| 10,000,310 B2 | 6/2018 | Thorstensen-Woll |
| 10,150,590 B2 | 12/2018 | Thorstensen-Woll |
| 10,196,174 B2 | 2/2019 | Thorstensen-Woll |
| 10,259,626 B2 | 4/2019 | Thorstensen-Woll |
| 10,549,510 B2 | 2/2020 | Ettridge |
| 10,556,732 B2 | 2/2020 | Cassidy |
| 10,604,315 B2 | 3/2020 | Thorstensen-Woll |
| 10,882,673 B2 | 1/2021 | Shah |
| 10,899,506 B2 | 1/2021 | Thorstensen-Woll |
| 10,934,069 B2 | 3/2021 | Clark |
| 10,954,032 B2 | 3/2021 | Thorstensen-Woll |
| 11,059,644 B2 | 7/2021 | Cassidy |
| 11,285,695 B2 | 3/2022 | Brumbaugh |
| 11,498,316 B2 | 11/2022 | Dietrich |
| 2001/0023870 A1 | 9/2001 | Mihalov |
| 2001/0031348 A1 | 10/2001 | Jud |
| 2002/0028326 A1 | 3/2002 | Lhila |
| 2002/0068140 A1 | 6/2002 | Finkelstein |
| 2003/0087057 A1 | 5/2003 | Blemberg |
| 2003/0108714 A1 | 6/2003 | Razeti |
| 2003/0168423 A1 | 9/2003 | Williams |
| 2003/0196418 A1 | 10/2003 | O'Brien |
| 2004/0013862 A1 | 1/2004 | Brebion |
| 2004/0028851 A1 | 2/2004 | Okhai |
| 2004/0043165 A1 | 3/2004 | Van Hulle |
| 2004/0043238 A1 | 3/2004 | Wuest |
| 2004/0071934 A1 | 4/2004 | Giles |
| 2004/0109963 A1 | 6/2004 | Zaggia |
| 2004/0197500 A9 | 10/2004 | Swoboda |
| 2004/0211320 A1 | 10/2004 | Cain |
| 2005/0003155 A1 | 1/2005 | Huffer |
| 2005/0048307 A1 | 3/2005 | Schubert |
| 2005/0080193 A1* | 4/2005 | Wouters ................. C09J 133/04 525/191 |
| 2005/0100718 A1 | 5/2005 | Peiffer |
| 2005/0208242 A1 | 9/2005 | Smelko |
| 2005/0208244 A1 | 9/2005 | Delmas |
| 2005/0218143 A1 | 10/2005 | Niederer |
| 2005/0279814 A1 | 12/2005 | Drummond |
| 2006/0000545 A1 | 1/2006 | Nageli |
| 2006/0003120 A1 | 1/2006 | Nageli |
| 2006/0003122 A1 | 1/2006 | Nageli |
| 2006/0068163 A1 | 3/2006 | Giles |
| 2006/0124577 A1 | 6/2006 | Ross |
| 2006/0151415 A1 | 7/2006 | Smelko |
| 2006/0278665 A1 | 12/2006 | Bennett |
| 2007/0003725 A1 | 1/2007 | Yousif |
| 2007/0007229 A1 | 1/2007 | Yousif |
| 2007/0014897 A1 | 1/2007 | Ramesh |
| 2007/0051690 A1 | 3/2007 | Hidding |
| 2007/0065609 A1 | 3/2007 | Korson |
| 2007/0267304 A1 | 11/2007 | Portier |
| 2007/0290012 A1 | 12/2007 | Jackman |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0135159 A1 | 6/2008 | Bries |
| 2008/0145581 A1 | 6/2008 | Tanny |
| 2008/0156443 A1 | 7/2008 | Schaefer |
| 2008/0169286 A1 | 7/2008 | Mclean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2008/0260305 A1 | 10/2008 | Shah |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | Mclean |
| 2010/0059942 A1 | 3/2010 | Rothweiler |
| 2010/0089860 A1 | 4/2010 | Wiggins |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | Obrien |
| 2010/0213193 A1 | 8/2010 | Helmlinger |
| 2010/0221483 A1 | 9/2010 | Gonzalez Carro |
| 2010/0279041 A1 | 11/2010 | Mathew |
| 2010/0290663 A1 | 11/2010 | Trassl |

(56) References Cited

U.S. PATENT DOCUMENTS

| | | |
|---|---|---|
| 2010/0314278 A1 | 12/2010 | Fonteyne |
| 2011/0000917 A1 | 1/2011 | Wolters |
| 2011/0005961 A1 | 1/2011 | Leplatois |
| 2011/0049002 A1 | 3/2011 | Georgelos |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | Mclean |
| 2011/0147353 A1 | 6/2011 | Kornfeld |
| 2011/0152821 A1 | 6/2011 | Kornfeld |
| 2012/0000910 A1 | 1/2012 | Ekkert |
| 2012/0043330 A1 | 2/2012 | Mclean |
| 2012/0067896 A1 | 3/2012 | Daffner |
| 2012/0070636 A1 | 3/2012 | Thorstensen-Woll |
| 2012/0077029 A1 | 3/2012 | Troutman |
| 2012/0103988 A1 | 5/2012 | Wiening |
| 2012/0111758 A1* | 5/2012 | Lo .................. B65D 51/22 206/524.6 |
| 2012/0241449 A1 | 9/2012 | Frischmann |
| 2012/0241458 A1 | 9/2012 | Boiron |
| 2012/0279973 A1 | 11/2012 | Capitani |
| 2012/0285920 A1 | 11/2012 | Mclean |
| 2012/0288693 A1 | 11/2012 | Stanley |
| 2012/0312818 A1 | 12/2012 | Ekkert |
| 2013/0020324 A1 | 1/2013 | Thorstensen-Woll |
| 2013/0020328 A1 | 1/2013 | Duan |
| 2013/0045376 A1 | 2/2013 | Chen |
| 2013/0121623 A1 | 5/2013 | Lyzenga |
| 2013/0177263 A1 | 7/2013 | Duan |
| 2013/0248410 A9 | 9/2013 | Spallek |
| 2014/0001185 A1 | 1/2014 | Mclean |
| 2014/0037916 A1 | 2/2014 | Bill |
| 2014/0037940 A1 | 2/2014 | Tetsuo |
| 2014/0061196 A1 | 3/2014 | Thorstensen-Woll |
| 2014/0061197 A1 | 3/2014 | Thorstensen-Woll |
| 2014/0186589 A1 | 7/2014 | Chang |
| 2014/0224800 A1 | 8/2014 | Thorstensen-Woll |
| 2014/0284331 A1* | 9/2014 | Thorstensen-Woll .... B32B 7/12 220/258.2 |
| 2014/0326727 A1 | 11/2014 | Jouin |
| 2015/0053680 A1 | 2/2015 | Yuno |
| 2015/0083723 A1 | 3/2015 | Thorstensen-Woll |
| 2015/0131926 A1 | 5/2015 | Lux |
| 2015/0158643 A1 | 6/2015 | Coker et al. |
| 2015/0197385 A1 | 7/2015 | Wei |
| 2015/0225116 A1 | 8/2015 | Thorstensen-Woll |
| 2015/0291342 A1 | 10/2015 | Mack |
| 2015/0321808 A1 | 11/2015 | Thorstensen-Woll |
| 2016/0001952 A1 | 1/2016 | Kulkarni |
| 2016/0159546 A1 | 6/2016 | Cassidy |
| 2016/0185485 A1 | 6/2016 | Thorstensen-Woll |
| 2016/0325896 A1 | 11/2016 | Thorstensen-Woll |
| 2017/0173930 A1 | 6/2017 | Mclean |
| 2017/0253373 A1 | 9/2017 | Thorstensen-Woll |
| 2017/0259978 A1 | 9/2017 | Zamora |
| 2017/0291399 A1 | 10/2017 | Bourgeois |
| 2017/0361638 A1 | 12/2017 | Seth |
| 2018/0079576 A1 | 3/2018 | Cassidy et al. |
| 2018/0118439 A1 | 5/2018 | Thorstensen-Woll |
| 2018/0186122 A1 | 7/2018 | Bourgeois |
| 2019/0055070 A1 | 2/2019 | Brown |
| 2019/0092520 A1 | 3/2019 | Thorstensen-Woll |
| 2019/0225369 A1 | 7/2019 | Thorstensen-Woll |
| 2019/0270547 A1 | 9/2019 | Thorstensen-Woll |
| 2019/0276209 A1 | 9/2019 | Clark |
| 2020/0079561 A1 | 3/2020 | Zamora |
| 2020/0087056 A1 | 3/2020 | Bosetti |
| 2020/0108987 A1 | 4/2020 | De La Vega Sudan |
| 2020/0216256 A1 | 7/2020 | Miozzo |
| 2020/0277121 A1 | 9/2020 | Wei |
| 2020/0282708 A1 | 9/2020 | Leuer |
| 2021/0188489 A1 | 6/2021 | Thorstensen-Woll |
| 2021/0237951 A1 | 8/2021 | Ostergren |
| 2021/0292059 A1 | 9/2021 | Thorstensen-Woll |
| 2021/0292060 A1 | 9/2021 | Thorstensen-Woll |
| 2022/0152999 A1 | 5/2022 | Priscal |
| 2022/0194681 A1 | 6/2022 | Schell |
| 2022/0227554 A1 | 7/2022 | Lehrter |
| 2022/0274759 A1 | 9/2022 | Wegenberger |
| 2022/0355574 A1 | 11/2022 | Yee |
| 2022/0410545 A1 | 12/2022 | Thorstensen-Woll |
| 2022/0411146 A1 | 12/2022 | Sachs |
| 2023/0088010 A1 | 3/2023 | Francklow |
| 2023/0182457 A1 | 6/2023 | Utz |

FOREIGN PATENT DOCUMENTS

| | | |
|---|---|---|
| AU | 2021328601 A1 | 3/2023 |
| BR | 8200231 U | 9/2003 |
| BR | 0300992 A | 11/2004 |
| CA | 2015992 A1 | 1/1991 |
| CA | 2203744 A1 | 10/1997 |
| CA | 2297840 A1 | 2/1999 |
| CN | 1301289 A | 6/2001 |
| CN | 1639020 A | 7/2005 |
| CN | 101111437 A | 1/2008 |
| CN | 103193026 A | 7/2013 |
| CN | 104203765 A | 12/2014 |
| CN | 104755387 A | 7/2015 |
| CN | 104755388 A | 7/2015 |
| CN | 104853994 A | 8/2015 |
| CN | 106687386 A | 5/2017 |
| CN | 108238366 A | 7/2018 |
| CN | 108473247 A | 8/2018 |
| CN | 108481851 A | 9/2018 |
| CN | 108883602 A | 11/2018 |
| CN | 208070440 U | 11/2018 |
| CN | 109863021 A | 6/2019 |
| CN | 210794267 U | 6/2020 |
| CN | 211077015 U | 7/2020 |
| CN | 111605889 A | 9/2020 |
| CN | 113423649 A | 9/2021 |
| CN | 115179627 A | 10/2022 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| DE | 102013015581 B3 | 10/2014 |
| DE | 102020131929 A1 | 6/2022 |
| DE | 102020133989 A1 | 6/2022 |
| EP | 0135431 A1 | 3/1985 |
| EP | 0577432 A1 | 1/1994 |
| EP | 0668221 A1 | 8/1995 |
| EP | 0826598 A2 | 3/1998 |
| EP | 0826599 A2 | 3/1998 |
| EP | 0905039 A1 | 3/1999 |
| EP | 0717710 B1 | 4/1999 |
| EP | 0915026 A1 | 5/1999 |
| EP | 0706473 B1 | 8/1999 |
| EP | 1075921 A2 | 2/2001 |
| EP | 1199253 A2 | 4/2002 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1935636 A1 | 6/2008 |
| EP | 1968020 A1 | 9/2008 |
| EP | 1992476 A1 | 11/2008 |
| EP | 2014461 A1 | 1/2009 |
| EP | 2230190 A1 | 9/2010 |
| EP | 2292524 A1 | 3/2011 |
| EP | 2599735 A1 | 6/2013 |
| EP | 2230190 B1 | 8/2014 |
| EP | 2778090 A1 | 9/2014 |

(56) References Cited

FOREIGN PATENT DOCUMENTS

| | | |
|---|---|---|
| EP | 3587297 A1 | 1/2020 |
| EP | 3615325 A1 | 3/2020 |
| EP | 3278972 B1 | 10/2020 |
| EP | 3829869 A2 | 6/2021 |
| EP | 3887275 A1 | 10/2021 |
| EP | 3898219 A1 | 10/2021 |
| EP | 3946936 A1 | 2/2022 |
| EP | 3969276 A1 | 3/2022 |
| EP | 3986711 A1 | 4/2022 |
| EP | 3995307 A1 | 5/2022 |
| EP | 3997268 A1 | 5/2022 |
| EP | 4038131 A1 | 8/2022 |
| EP | 4151549 A1 | 3/2023 |
| EP | 4161777 A1 | 4/2023 |
| EP | 4194361 A1 | 6/2023 |
| FR | 2693986 A1 | 1/1994 |
| FR | 2916157 A1 | 11/2008 |
| FR | 2943322 A1 | 9/2010 |
| GB | 1216991 A | 12/1970 |
| GB | 2353986 A | 3/2001 |
| GB | 2501967 A | 11/2013 |
| JP | H02265735 A | 10/1990 |
| JP | H09110077 A | 4/1997 |
| JP | 2004212778 A | 7/2004 |
| JP | 2014015249 | 1/2014 |
| KR | 100711073 B1 | 4/2007 |
| KR | 100840926 B1 | 6/2008 |
| KR | 100886955 B1 | 3/2009 |
| KR | 102501281 B1 | 2/2023 |
| MX | 05002905 A | 2/2006 |
| MX | 2010001867 A | 4/2010 |
| TW | 201217237 A | 5/2012 |
| WO | 9702997 A1 | 1/1997 |
| WO | 9905041 A1 | 2/1999 |
| WO | 0066450 A1 | 11/2000 |
| WO | 03101500 A1 | 12/2003 |
| WO | 2005009868 A1 | 2/2005 |
| WO | 2005030860 A1 | 4/2005 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008113855 A1 | 9/2008 |
| WO | 2008118569 A2 | 10/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |
| WO | 2013134665 A1 | 9/2013 |
| WO | 2014190395 A1 | 12/2014 |
| WO | 2015119988 A1 | 8/2015 |
| WO | 2016203251 A1 | 12/2016 |
| WO | 2017155946 A1 | 9/2017 |
| WO | 2017187024 A1 | 11/2017 |
| WO | 2018081419 | 5/2018 |
| WO | 2018081533 A1 | 5/2018 |
| WO | 2019149558 A1 | 8/2019 |

OTHER PUBLICATIONS

Patent Cooperation Treaty, Written Opinion of the International Searching Authority dated Aug. 17, 2021 for International Application No. PCT/US2021/032390 (5 pages)

European Patent Office, Extended European Search Report for European Patent Application No. 21 812 175.4 dated Jun. 18, 2024, 9 pages.

China National Intellectual Property Administration, First Office Action issued Apr. 24, 2025 for Chinese Application No. 202180038479.6, 11 pages.

* cited by examiner

DISPENSING LINER

CROSS-REFERENCE TO RELATED APPLICATIONS

This application is a U.S. national phase application filed under 35 U.S.C. § 371 of International Application Number PCT/US2021/032390, filed May 14, 2021, designating the United States, which claims benefit of U.S. Provisional Application No. 63/031,818, filed May 29, 2020, which are hereby incorporated herein by reference in their entirety.

FIELD

The present application relates to seals for containers and, more specifically, to seals for containers whereby the contents of the container can be dispensed through a portion of the seal.

BACKGROUND

It is often desirable to seal the opening of a container using a removable or peelable liner system, seal, sealing member, or inner seal. Often a cap or other closure is then screwed or placed over the container opening capturing the sealing member therein. In use, a consumer typically removes the cap or other closure to gain access to the sealing member and then removes or otherwise peels the seal from the container in order to dispense or gain access to its contents.

In some forms, containers hold liquids, powders, and the like whereby the contents of the container may be dispensed in a measured manner. For example, liquid medication may be dispensed whereby a syringe is inserted into the container. In other forms, the contents may be poured from the container into a measuring device. In these regards, it is oftentimes desirable to contain the contents, but also have a small or otherwise controllable opening for more accurate dispensing.

Similarly, it is sometimes desirable to have a dispenser or sifter provided to dispense smaller particles in a controlled manner. For example, oftentimes spices are dispensed from a sifter-type structure having many openings so as to disperse and distributed the contents of the container.

In prior systems, a seal is positioned below a rigid sifting structure. The seal was configured to seal the contents of the container and had to be removed to gain access to the contents. However, to remove the seal, a user would first need to remove the rigid sifting structure, remove the seal, then replace the rigid sifting structure on the container. This multi-step process may be complicated for certain users and also increases the chances that the user is unable to re-install the rigid sifting structure for use.

Other dispensers or sifters typically had to be configured such that they were registered with the other components on the seal. For example, a seal or dispenser having one or more openings would have to be configured such that the openings were not positioned near the land area of the seal and container. If the openings were positioned near the land area, the seal would likely be compromised and would not fully adhere to the container. Further the openings would also typically have to be positioned relative to one or more tabs or other structures so as to maintain seal integrity.

By requiring registration of the various components of the seal, overall seal constructions and assembly was more difficult, time consuming and expensive. Registration required the various layers of the seal be positioned in precise locations and/or be cut in very precise manners. In addition to being time consuming and expensive, this can also be especially difficult and result in waste.

SUMMARY

Various enhancements of seals are provided herein with dispensing functionality. The below features shown and described in the various embodiments may be used alone or in combination with one another. For example, one or more features of one embodiment may be used in another embodiment such that the features may be interchangeable.

In one form, a dispensing liner for a container is provided. The liner may include an upper portion having a support layer and a compensatory sealing layer and a lower portion. The lower portion defines at least one opening whereby contents of the container may be dispensed therethrough. The lower portion includes a sealant layer for sealing to the container. The upper portion is removably adhered to the lower portion and the compensatory sealing layer extends through the at least one opening when installed on the container to help seal the dispensing liner to the container.

A method for forming a dispensing liner for use on a container is also provided. The method includes the steps of providing an upper portion having a support layer and a compensatory sealing layer; providing a lower portion defining at least one opening whereby contents of the container may be dispensed therethrough, the lower portion including a sealant layer for sealing to the container; and removably securing the upper and lower portions to one another, the upper portion being removable from the lower portion by a user, the compensatory sealing layer extending through the at least one opening when installed on the container to help seal the dispensing liner to the container.

According to one form, the system further includes a plurality of openings in the lower portion provided in a random pattern such that the openings are not in registration with edges of the lower portion.

In accordance with one form, the compensatory sealing layer comprises at least one of ethylene vinyl acetate, ethylene acrylic acid, copolymers of polyethylene and ethylene vinyl acetate, various wax blends, tackified extrusion coatings, and combinations thereof.

In one form, the compensatory sealing layer has a thickness of about 1.0 to about 3.0 mil.

According to one form, the lower portion further includes a release layer.

In accordance with one form, the lower portion includes a microcavitated polyethylene or microvoided polyethylene terephthalate (PET) to help provide release between the upper and lower portions.

In one form, the sealing layer has a thickness of about 0.5 to about 2.5 mil.

According to one form, the lower portion includes a polymer foam layer.

In accordance with one form, the polymer foam is a polyethylene terephthalate backed polyolefin foam, including about 0.5 PET laminated to about 2.5 to about 4.0 mil foam.

In one form, the liner system further includes a foil induction layer.

According to one form, the liner system includes a plurality of openings and each opening has a diameter of about 1 mm to about 5 mm. However, the sizes may vary as desired.

In accordance with one form, a ratio of the area of the plurality of openings to an overall liner system surface area can vary depending on the materials chosen, the strengths, and the like.

In one form, the upper portion is partially bonded to the lower portion to define a tab.

According to one form, the liner system further includes at least one externally extending side tab.

In accordance one form the lower portion has a thickness of about 1 mil to about 8 mil.

In one form, the density of the lower portion may also vary.

DETAILED DESCRIPTION

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

It should be appreciated that a variety of terms may be used for sealing members, such as liners, liner systems, seals, and the like. In general, such structures include multi-layered components that are configured to temporarily and/or permanently adhere at least a portion of the structure to a container.

For simplicity, this disclosure generally may refer to a container or bottle, but the sealing members herein may be applied to any type of container, bottle, package or other apparatus having a rim or mouth surrounding an access opening to an internal cavity. In this disclosure, reference to upper and lower surfaces and layers of the components of the sealing member refers to an orientation of the components as generally depicted in the figures and when the sealing member is in use with a container in an upright position and having an opening at the top of the container. Different approaches to the sealing member will first be generally described, and then more specifics of the various constructions and materials will be explained thereafter. It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from die sealing member during heating to be retained in a cap or other closure used on the container. In a two-piece construction, a wax layer, for example, may be used to temporarily bond the sealing member to a liner. Other types of releasable layers may also be used to provide a temporary bond between the seal and liner, but the releasable layers are generally heat activated.

Figure 1:
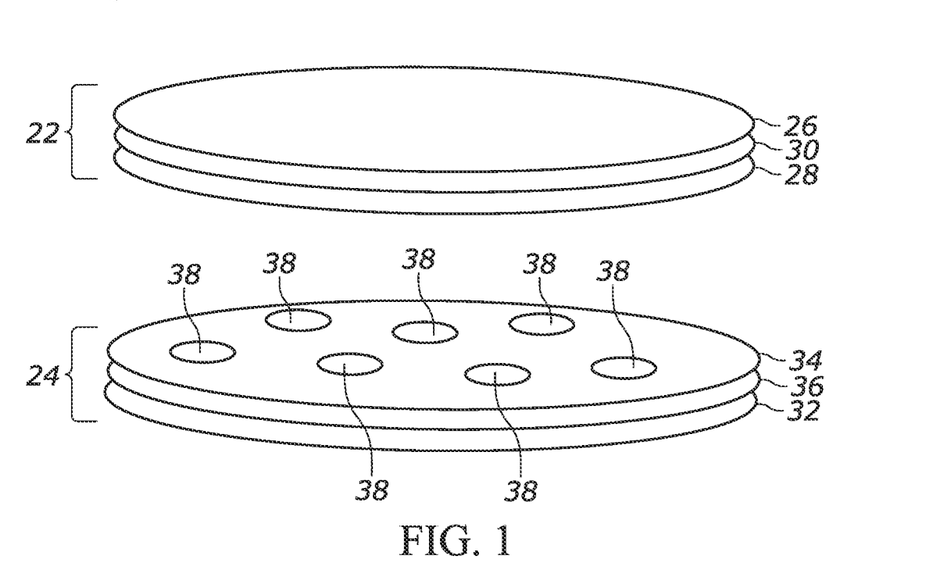
FIG. 1 is an exploded view of one form of a dispensing liner system.

Referring to FIG. 1 a first form of a system 20 is shown. The system 20 generally incudes an upper portion 22 and a lower portion 24. The upper portion 22 includes a support layer 26 and a compensatory layer 28. In one form, the upper portion 22 may also include a membrane layer 30. The membrane layer 30 may be an induction heating layer, such as a metal foil, and may also provide moisture barrier properties, oxygen barrier properties, and the like. While shown in the upper portion 22, the membrane layer 28 may be included in the lower portion 24 or not included in either layer.

The lower portion 24 includes a sealant layer 32 for sealing to a container. The lower portion 24 may also include a release layer 34 that permits the upper portion 22 to be removable from the lower portion 24 by a user. In one form, the lower portion 24 may also include a polymer layer 36. The polymer layer 36 may take a variety of different forms, such as foams, films, and the like. Further, the polymer layer 36 may provide a variety of different functionality, such as providing structural support, Insulation properties, and the like. It should be understood that the lower portion 24 may also include multiple forms of the above described layers, as well as additional layers.

The lower portion 24 also includes at least one opening 38. As shown in FIG. 1, the lower portion 24 includes a plurality of openings 38. In one form, the openings 38 are configured to extend through the entirety of the lower portion 24 and through each layer therein.

In general, the compensatory layer 28 is configured such that it will flow through at least some of the openings to help seal the system 20 to a container. More specifically, the compensatory layer 28 may flow through at least openings positioned above the land area of the container during the sealing process of the system 20 on the container. For example, the system may be adhered to the container during an induction sealing process. The membrane layer 30 provides heat during the induction heating process such that the heat can cause the sealant layer 32 to seal to the container and also cause at least a portion of the compensatory layer 28 to flow through openings and also seal to the container.

It should be appreciated that the system 20 shown in FIG. 1 does not include a top tab or an outwardly extending tab. In this form, a user would use their fingernail or other small tool to begin peeling the upper portion 22 from the lower portion 24. In other forms, the system may include a tab extending from the overall circumference of the system 20 to form a grasping tab to remove the upper portion 22.

Figure 2:
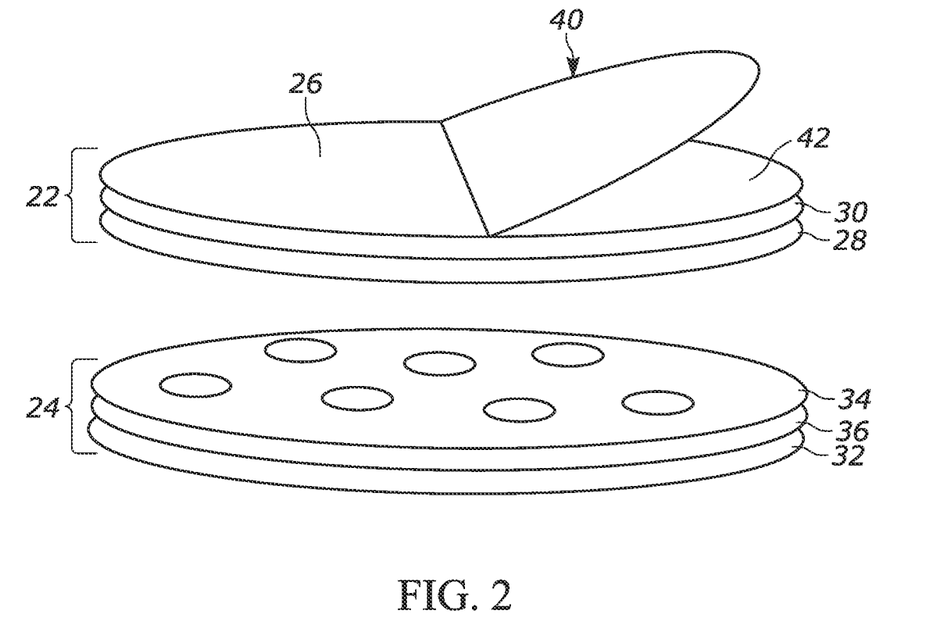
FIG. 2 is an exploded view of another form of a dispensing liner system.

In yet another form, such as shown in FIG. 2, the upper portion 22 includes a top tab 40 to help a user remove the upper portion from the lower portion 24. The top tab 40 includes any number of layers in the upper portion 22. In one form, such as shown in FIG. 2, the top tab includes support layer 26 whereby support layer 26 is partially adhered to other layers of the upper portion. However, other layers may also be used to help form the top tab 40. Further, a release layer 42 may be included so as to help release the top tab 40 and ensure that it is readily graspable by a user.

Figure 3:
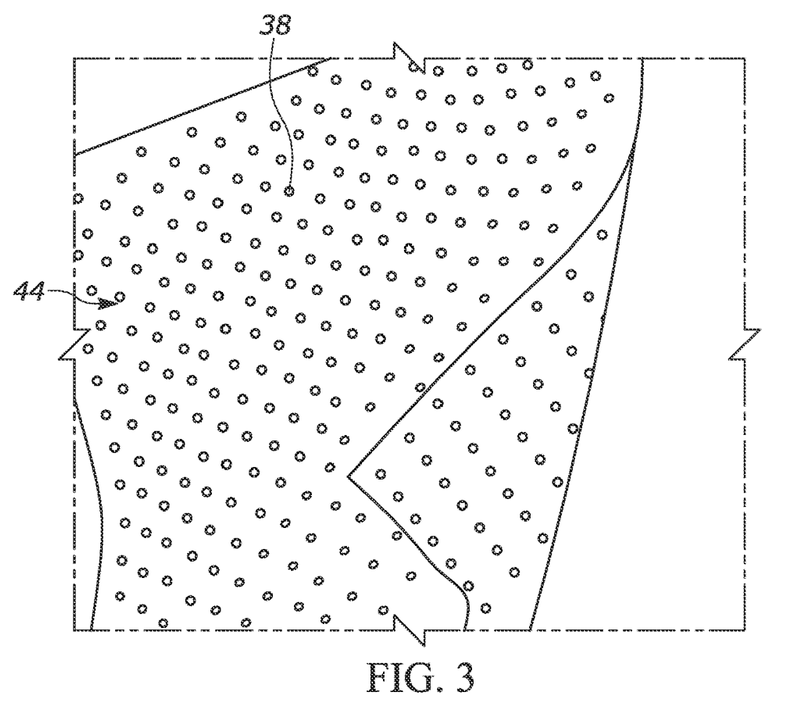
FIG. 3 is perspective view of a lower portion of a dispensing liner system.

An uncut laminate 44 of lower portion 24 is shown in FIG. 3. In this form, it can be seen that the openings 38 extend entirely through the thickness of the lower portion 24. While shown as being in a regular pattern, the openings can take regular or irregular patterns. Further, the size of the openings may be varied, as desired, and may also include irregularly shaped openings. The openings may also include various sizes in a single seal or system. The openings can have a variety of sizes, such as from about 1 mm and up, depending on the size of the container opening and the contents of the container. In one faint, the openings can be in a ratio to the overall surface area of the lower portion. The location and size of the openings relative to the land area or rim can also be modified. For example, when there is a larger land area, the sizes of the openings can be increased.

Further, it can be seen that the lower portion 24 can include printing, so as to help provide tamper indication as well as information regarding the source of the seal and/or contents of the container so as to prevent counterfeiting.

Some of the details of the layers noted above will be discussed below. As lower portion 24 includes openings 38 that may or may not be positioned in areas required for sealing, the upper portion 22 includes the compensatory sealing layer 28. The compensatory sealing layer is configured to flow into the openings 38, especially openings positioned towards the peripheral edge of the system 20. In this regard, the compensatory layer 28 functions as a secondary sealing layer to assist sealant layer 32. Since there are openings 38 that may be positioned toward the peripheral edge, where the system would typically seal to a land area of a container, the compensatory layer 28 is configured to extend through the lower portion 24 to seal against the container. As a result of the compensatory layer 28 and the sealant 32, the sealing system is able to provide a desired seal to the container. Further, since the compensatory layer is configured in this manner, the openings do not need to be positioned in specific areas and the overall seal does not need to be manufactured or installed such that any of the components need to be in registration.

The compensatory sealing layer 28 can include a variety of materials and can be configured based on the adjacent layers as well as the conditions used to install the system. For example, the compensatory layer 28 can include one or more of a variety of different polymeric compositions. The compensatory layer may include one or more of copolymers of polyethylene and ethylene vinyl acetate, ethylene acrylic acid, various wax blends, tackified extrusion coatings, and combinations thereof.

In one form, the compensatory layer may have a melt point of about 75 to about 102° C. Further, the compensatory layer may be provided in a variety of different thick-nesses, depending on the size of the openings. For example, in one form, the compensatory layer may have a thickness of about 1 to about 8 mil so as to provide sufficient material to flow into the openings. In one form, the compensatory layer has a flowability at a desired temperature. In one faint, the material may have a softening point of about 70 to about 115° C.

As indicated above, the compensatory layer may be configured to provide sealing functionality to the container, at least in areas where there are openings adjacent the land area. In this regard, the compensatory layer may be configured to provide a bond strength of about 1000 to about 2500 g/in. For example, when the container is PET, the compensatory layer may be composed of a PET laminate or film with a heat seal coating such as DuPont Mylar OL of Mylar CL, or EVA hot melt wax. The bond strength should not be too strong so as to cause portions of the seal to not release from the container. In another form, the compensatory layer may form more of a weld seal such that if the openings are small and/or spaced apart, the compensatory layer extending to the container rim may remain and then other portions of the compensatory layer may rupture to release the seal from the container.

The membrane layer 30 can be configured to provide heat, such as during an induction heating process, as well as provide various barrier properties. As shown in the figures, in one form, the membrane layer 30 may be provided in the upper portion 22. In other forms, the membrane layer 30 may be provided in the lower portion 24. In other forms, multiple membrane layers may be provided in one or more of the upper and lower portions 22, 24.

The materials and properties of the membrane layer may be modified as needed to provide desired properties. For example, the membrane layer may be modified based on the thicknesses and material types of the other layers in the system. For example, in one form, the membrane layer may be an aluminum foil that can have a thickness between about portions 22, 24.

More specifically, the membrane layer may be one or more layers configured to provide induction heating and/or barrier characteristics to the seal. A layer configured to provide induction heating is any layer capable of generating heat upon being exposed to an induction current where eddy currents in the layer generate heat. By one approach, the membrane layer may be a metal layer, such as, aluminum foil, tin, and the like. In other approaches, the membrane layer may be a polymer layer in combination with an induction heating layer. The membrane layer may also be or include an atmospheric barrier layer capable of retarding the migration of gases and moisture at least from outside to inside sealed container and, in some cases, also provide induction heating at the same time. Thus, the membrane layer may be one or more layers configured to provide such functionalities.

The support layer 26 may perform a variety of functions such as providing support to the upper portion, tear resistance, insulation, and the like. The support layer may also be considered as a backing layer for one or more of the layers in the upper portion. The support layer 26 can be formed from a variety of materials, such as polymers, paper, cardboard, and the like.

In one form, the support layer 26 may be polyethylene terephthalate (PET), nylon, or other structural polymer layer and may be, in some approaches, about 0.5 to about 1 mil thick. Other materials such as paper and PET may be used. Further, laminates of layers, such as a laminate of PET/adhesive/foam may be used to insulate since the layer is in contact with the inside of the closure. This can help prevent melting and sticking to the closure. Other materials such as nylon and the like may be used.

Release layer 34 is generally positioned in the lower portion. However, in other forms, the release layer 34 may be positioned on the lower surface of the upper portion so as to provide release from one of the lower and upper portions. In general, the release layer is configured such that the upper and lower portions separate from one another when the upper portion is pulled by a user. The release layer must be suitable to maintain the upper and lower portions coupled to one another during manufacture, installation into a cap, and final sealing onto a container. After the user removes the cap, the release layer will fracture, release, or otherwise permit the upper and lower portions to separate from one another.

The release layer may be formed from a variety of different materials. Such materials include, but are not limited to, PTFE, PET, and the like. The release layer can be provided in a variety of thicknesses, depending on if the release layer is desired to provide support to the lower or upper portion. The surface of the release layer may also be prepared such that it has enhanced release properties. For example, the surface may include micro-perforations or texturing to decrease surface contact on at least one side. The release layer may also be coated with materials such as silicone, nitrocellulose release coatings, lacquers containing release promoting components such as talc or silica or slip additives such as erucamide or antiblock additives such as crodamide. Other materials may also be used such as a polymer matrix formulated to contain similar release promoting agents described above.

In some forms, the lower portion can include just a release layer that functions as both the release layer and support layer and possibly as a sealant layer, as might otherwise be provided by the polymer layer 36. For example, microcavitated polyester can be used which promotes release properties of the upper portion due to the differential surface properties of the film. Such a material may be especially suitable to seal to PET containers. A seal to other polymeric containers would be achieved by modification of the seal layer. For example, polyethylene containers can be weld sealed with a suitable polyethylene sealing layers or peelable with modified co-polymers of EVA.

One specific type of material may include microcavitated PET 0.5 mil, such as Melinex 891, for the lower portion. This material could also be run as a thicker gauge 92 GA or 142 GA. If a thicker gauge was used it may be feasible to laminate the 0.5 mil to 0.5 mil standard packaging grade of PET such as Dupont 800C.

The polymer layer 36 can be a polymer film and/or polymer foam. In some forms, to support structural integrity, additional polymeric layers can be included in the structure. In one form, a layer of polymeric polyolefin foam was laminated between the release layer and the sealant layer. While this can have a negative impact on heat transfer to the sealant component, this can be balanced with the application of controlled induction parameters.

In one form, the lower laminate can include a PET backed polyolefin foam, such as about 0.5 PET laminated to about 2.5 to about 4.0 mil polyethylene foam. This can provide a variety of functions, such as structural support, insulation, and, in some cases, release properties.

The sealant layer 32 can be any suitable material for sealing to the container. The sealant composition can be modified depending on the type of container, the types of materials used in the lower portion, as well as the installation conditions. In one form, the sealant layer can typically include 0.5 mil to 2.5 mil thickness contacting the container laminated to or incorporated in an extrusion coated or laminated film.

The lower sealant or heal seal layer may be composed of any material suitable for bonding to the rim of a container, such as, but not limited to, induction, conduction, or direct bonding methods. Suitable adhesives, hot melt adhesives, or sealants for the heat sealable layer include, but are not limited to, polyesters, polyolefins, ethylene vinyl acetate, ethylene-acrylic acid copolymers, surlyn, and other suitable materials. By one approach, the heat sealable, layer may be a single layer or a multi-layer structure of such materials about 0.2 to about 3 mils thick. By some approaches, the heat seal layer is selected to have a composition similar to and/or include the same polymer type as the composition of the container. For instance, if the container includes polyethylene, then the heat seal layer would also contain polyethylene. If the container includes polypropylene, then the heat seal layer would also contain polypropylene. Other similar materials combinations are also possible.

In one form, the upper portion provides compression to the lower portion. This can be helpful in maintaining an appropriate seal between the sealant layer and the container. Further, by providing compression, the compensatory layer may be better directed into the openings.

The thicknesses and densities of the layers used in the seal can be varied as needed. Further the relative thicknesses and densities of the lower and upper portions can be varied.

In some forms, heat transfer can be important and require the maintenance of structural integrity in the presence of elevated temperatures. For instance, sufficient heat must be transferred to the sealant layer and also the compensatory layer to flow through the openings. However, the heat cannot be such that it detrimentally impacts other layers in the system.

In this regard, the thickness and density of the lower portion can be significant as it must resist the heat from induction without degrading or distorting, the liner. In some forms, it may also be desirable to remain peelable and puncturable. In some forms, the lower portion may be composed to seal to particular polymers or to a range of such as defined by many of the sealants available and understood by packaging art.

As noted above, various types of materials may be used in the structure described herein. For example, polyethylene/EVA multilayer coextruded blown films. Extrusion coated PET and PE containers may be used. Additionally, monolayer blown PE films could be used to form more of a weld seal.

As noted above, a wide range of polymers of variable thickness and structural composition may be used in combination. The membrane, such as a metal foil, density of the polymer and duration of the induction application can be adjusted to provide desired seal performance. Heat is transferred from the membrane (primary induction component) to the sifter component (lower portion) to impact the structural stability of the sifter under the stress of heat. The construction and polymer selection will control structural integrity and benefits to the performance of the application.

The compensatory layer can be configured such that it is suitably flowable under the induction heating conditions. In general, the compensatory layer is needed to maintain seal integrity. The compensatory layer material must be capable of flowing and sealing to the container land or other contact surface or vessel requiring sealability.

Figure 4:
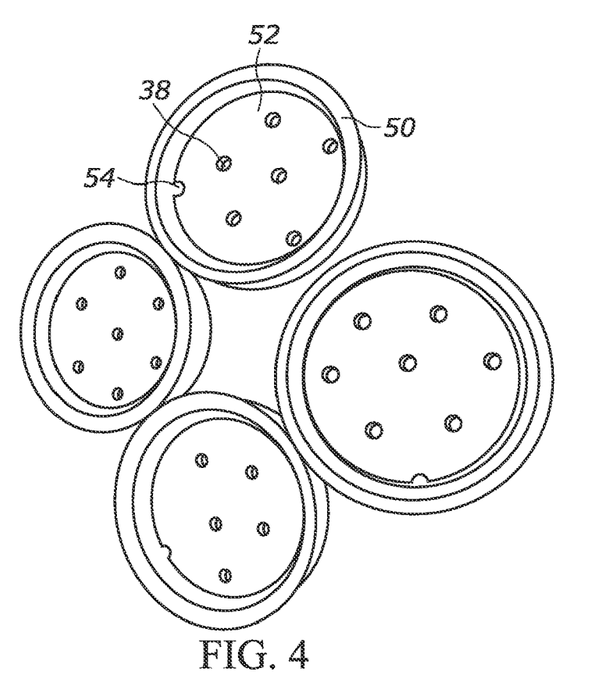
FIG. 4 is a bottom view of a liner system installed in a cap.

FIG. 4 illustrates one form of a system installed in a plurality of caps 50. Since the openings are not positioned in registration with the edges of seal 52, any number of the openings may be positioned near a land area when the cap is installed on a container. For example, opening 54 is positioned such that the opening 54 would contact the land area.

Figure 5:
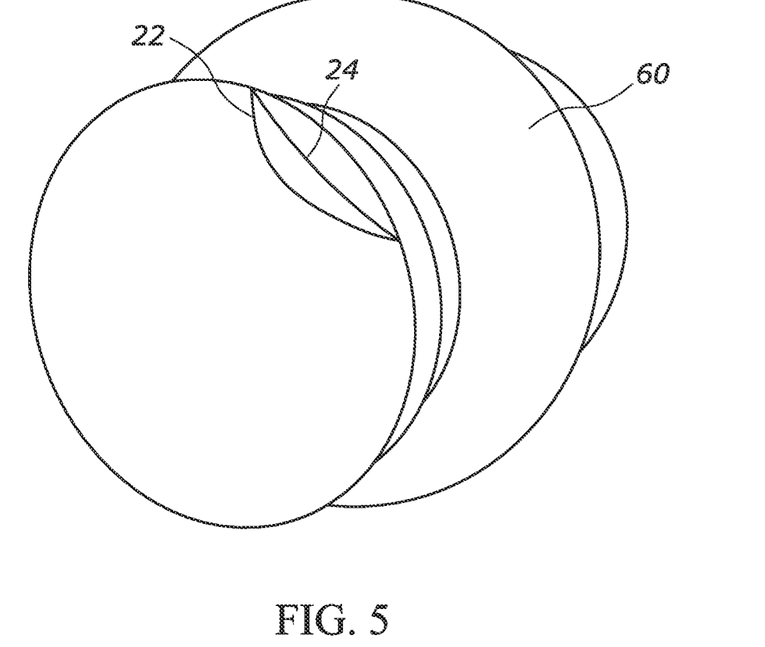
FIG. 5 is a top view of an upper portion of a liner system having an external tab as removal is initiated.
Figure 6:
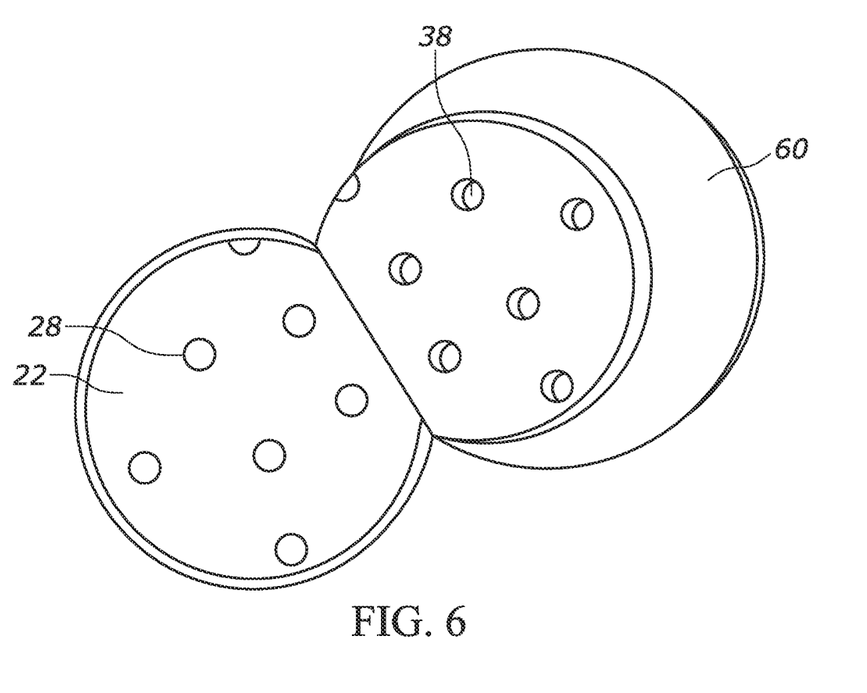
FIG. 6 is a top perspective view of the liner system of FIG. 5 as the upper portion is being removed from the lower portion.
Figure 7:
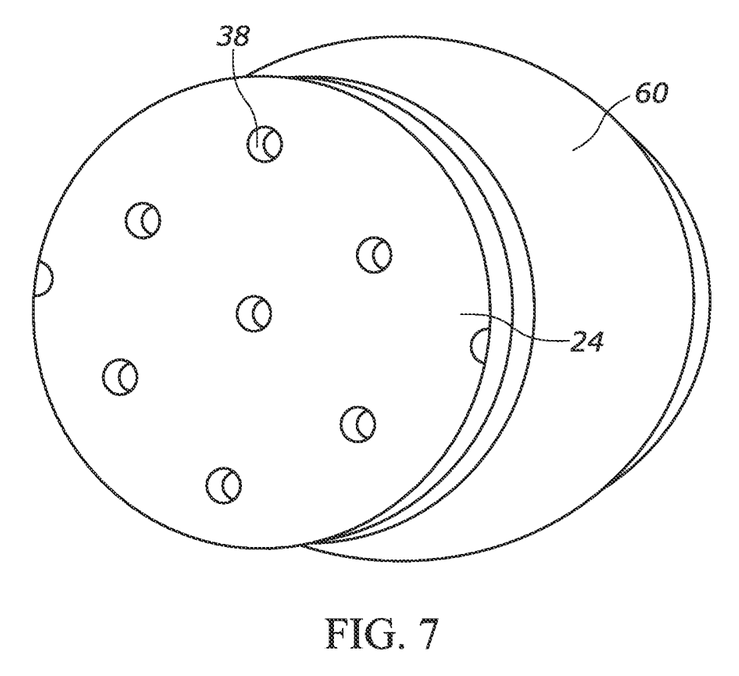
FIG. 7 is a top view of the system of FIG. 5 as the upper portion is removed.

FIG. 5 illustrates one form of an upper portion 22 as it is initially being separated from the lower portion 24, when installed on a container 60. FIG. 6 illustrates the upper portion 22 as it continues to separate from the lower portion 24. The lower portion 24 remains on the container 60. FIG. 7 shows the upper portion 22 completely removed from the lower portion 24. Further, it can be seen that the compensatory layer 28 from inner openings 38 is removed with the upper layer 22. The compensatory layer 28 is not completely removed from the openings 38 that are positioned above the land areas of the container such that at least a portion of the compensatory layer is maintained with the lower portion 24.

Figure 8:
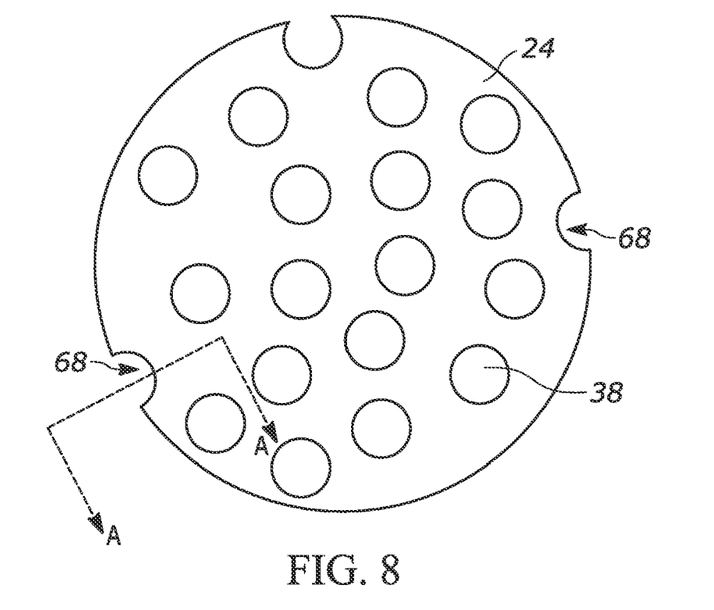
FIG. 8 is a top view of the lower portion of a liner system whereby openings are located at an external portion, above a land area of a container.
Figure 9:
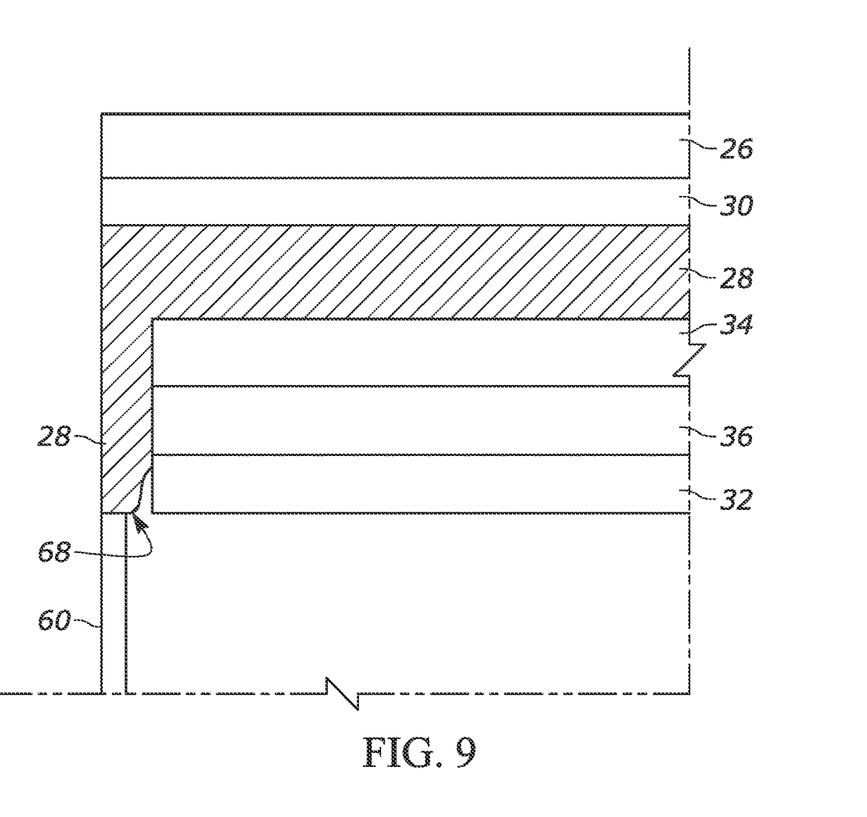
FIG. 9 is a partial cross-sectional view of a liner system whereby openings are located above the land area of a container.

FIG. 8 illustrates one form of the lower portion 24 having a variety of openings 38. Included in the openings are openings 68 that are positioned towards the peripheral edge of the lower portion and, when installed, would be positioned adjacent the land area of the container, FIG. 9 is a partial cross-sectional view taken along line A-A of FIG. 8 after the lower portion 24 is combined with the upper portion 22 and installed on a container 60, As seen in FIG. 9, a portion of compensatory layer 28 has flowed into opening 68 of the lower laminate to contact the container 60. This can help maintain a proper seal on the container even if openings are positioned adjacent the land area.

In addition to the above described features, the lower portion and upper portion may include a variety of different materials and layers. For instance, the lower seal portion may include a metal foil, and the top surface of the lower seal portion may be the metal foil. The lower seal portion may also include a foamed polymer, or the top surface of the lower seal portion may be a polymer film selected from polyolefin materials and polyester materials.

Additional layers may be included in the upper and/or lower portions such as polyethylene terephthalate (PET), nylon, or other structural polymer layer and may be, in some approaches, about 0.5 to about 1 mil thick. In some approaches, additional layers may be included in the lower and/or upper portions. It should be appreciated that the lower seal portion may include any number of other layers, such as polymer layers, adhesives, polymer films, polymer foams and the like.

The polymer layers used in the upper and/or lower portions may take a variety of forms such as coatings, films, foams, and the like. Suitable polymers include but are not limited to, polyethylene, polypropylene, ethylene-propylene copolymers, blends thereof as well as copolymers or blends with higher alpha-olefins. By one approach, one or more of the polymer layers may be a blend of polyolefin materials, such as a blend of one or more high density polyolefin components combined with one or more lower density polyolefin components. In one form, one polymer layer may be a polyethylene film while another polymer layer may be a PET film. According to one form, the polyethylene film may have a thickness of about 5 to about 20 microns while the PET film may have a thickness of about 5 to about 20 microns.

A support layer may be optional in the upper and/or lower portions. If included, it may be polyethylene terephthalate (PET), nylon, or other structural polymer layer and may be, in some approaches, about 0.5 to about 1 mil thick.

In some forms, the systems may include an insulation layer or a heat-redistribution layer. In one form, the insulation layer may be a foamed polymer layer. Suitable foamed polymers include foamed polyolefin, foamed polypropylene, foamed polyethylene, and polyester foams. In some forms, these foams generally have an internal rupture strength of about 2000 to about 3500 g/in. In some approaches, the foamed polymer layer 106 may also have a density less than 0.6 g/cc and, in some cases, about 0.4 to less than about 0.6 g/cc. In other approaches, the density may be from about 0.4 g/cc to about 0.9 g/cc. The foamed polymer layer may be about 1 to about 5 mils thick.

In other approaches, a non-foam heat distributing or heat re-distributing layer may be included. In such approach, the non-foam heat distributing film layer is a blend of polyolefin materials, such as a blend of one or more high density polyolefin components combined with one or more lower density polyolefin components. Suitable polymers include but are not limited to, polyethylene, polypropylene, ethylene-propylene copolymers, blends thereof as well as copolymers or blends with higher alpha-olefins. By one approach, the non-foam heat distributing polyolefin film layer is a blend of about 50 to about 70 percent of one or more high density polyolefin materials with the remainder being one or more lower density polyolefin materials. The blend is selected to achieve effective densities to provide both heat sealing to the container as well as separation of the liner from the seal in one piece.

A heat-activated bonding layer may include any polymer materials that are heat activated or heated to achieve its bonding characteristics or application to the seal. By one approach, the heat-activated bonding layer may have a density of about 0.9 to about 1.0 g/cc and a peak melting point of about 145° F. to about 155° F. A melt index of the bonding layer 120 may be about 20 to about 30 g/10 min. (ASTM D1238). Suitable examples include ethylene vinyl acetate (EVA), polyolefin, 2-component polyurethane, ethylene acrylic acid copolymers, curable two-part urethane adhesives, epoxy adhesives, ethylene methacrylate copolymers and the like bonding materials.

The adhesives useful for any of the adhesive or tie layers described herein include, for example, ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials. Other suitable materials may include low density polyethylene, ethylene-acrylic acid copolymers, and ethylene methacrylate copolymers. By one approach, any optional adhesive layers may be a coated polyolefin adhesive layer. If needed, such adhesive layers may be a coating of about 0.2 to about a 0.5 mil (or less) adhesive, such as coated ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials.

In one aspect, a lab may be formed by a full layer or partial layer of material combined with a partial width composite adhesive structure that includes a polyester core with upper and lower adhesives on opposite sides thereof. This partial composite adhesive structure bonds portions of layers to form the gripping tab.

The various layers of the sealing member are assembled via coating adhesives, applying films, and/or a heal lamination process forming a sheet of the described layers. Extrusion lamination may also be used. The resulting laminate sheet of the sealing members can be cut into appropriate sized disks or other shapes as needed to form a vessel closing assembly or sealing member. The cut sealing member is inserted into a cap or other closure which, in turn, is applied to the neck of a container to be sealed. The screw cap can be screwed onto the open neck of the container, thus sandwiching the sealing member between the open neck of the container and the top of the cap. The sealing layer may be a pressure sensitive adhesive, the force of attaching the closure to the container can activate the adhesive. The sealing layer may also be an adhesive that is activated heat, such as through induction heating, conduction heating, and the like.

The seals and systems described herein may be formed hl a variety of different manners. In one form, the upper portion and lower portions may each be separately formed and then joined together. In another form, a portion of one or more of the upper and lower portions may be used to join the upper and lower portions together.

It will be understood that various changes in the details, materials, and arrangements of parts and components which have been herein described and illustrated in order to explain the nature of the methods and compositions may be made by those skilled in the art within the principle and scope as expressed in the appended claims.

What is claimed is:

1. A dispensing liner system for a container, the system comprising:
    an upper portion having a support layer and a compensatory sealing layer; and
    a lower portion defining at least one opening whereby contents of the container may be dispensed therethrough, the lower portion including a sealant layer for sealing to the container, the upper portion being removably adhered to the lower portion, the compensatory sealing layer extending through the at least one opening and through the sealant layer when installed on the container to help seal the dispensing liner to the container.

2. The dispensing liner system of claim 1 further comprising a plurality of openings in the lower portion provided in a random pattern such that the openings are not in registration with edges of the lower portion.

3. The dispensing liner system of claim 1 wherein the compensatory sealing layer comprises at least one of ethylene vinyl acetate, ethylene acrylic acid, copolymers of polyethylene and ethylene vinyl acetate, wax blends, tackified extrusion coatings, and combinations thereof.

4. The dispensing liner system of claim 1 wherein the compensatory sealing layer has a thickness of about 1.0 to about 3.0 mil.

5. The dispensing liner system of claim 1 wherein the lower portion further includes a release layer.

6. The dispensing liner system of claim 1 wherein the lower portion includes a microcavitated polyethylene to help provide release between the upper and lower portions.

7. The dispensing liner system of claim 1 wherein the sealant layer has a thickness of about 0.5 to about 2.5 mil.

8. The dispensing liner system of claim 1 wherein the lower portion further includes a polymer foam layer.

9. The dispensing liner system of claim 8 wherein the polymer foam is a polyethylene terephthalate backed polyolefin foam, including about 0.5 mil PET laminated to about 2.5 to about 4.0 mil polyolefin foam.

10. The dispensing liner system of claim 1 further comprising a foil induction layer.

11. The dispensing liner system of claim 1 comprising a plurality of openings and each opening has a diameter of about 1 to about 5 mm.

12. The dispensing liner system of claim 1 wherein the lower portion has a thickness of about 1 to about 8 mil.

13. The dispensing liner system of claim 1 wherein the upper portion is partially bonded to the lower portion to define a tab.

14. The dispensing liner system of claim 1 further comprising at least one externally extending side tab.

15. A laminate for forming a dispensing liner system for use on a container, the laminate comprising:
    an upper portion having a support layer and a compensatory sealing layer; and
    a lower portion defining at least one opening whereby contents of the container may be dispensed therethrough, the lower portion including a sealant layer for sealing to the container, the upper portion being removably adhered to the lower portion, the compensatory sealing layer extending through the at least one opening and through the sealant layer when formed as a dispensing liner system and installed on the container to help seal the dispensing liner to the container.

16. A method of forming a dispensing liner system for use on a container, the method comprising:
    providing an upper portion having a support layer and a compensatory sealing layer;
    providing a lower portion defining at least one opening whereby contents of the container may be dispensed therethrough, the lower portion including a sealant layer for sealing to the container; and
    removably securing the upper and lower portions to one another, the upper portion being removable from the lower portion by a user, the compensatory sealing layer extending through the at least one opening and through the sealant layer when installed on the container to help seal the dispensing liner to the container.

17. The dispensing liner system of claim 1 wherein the upper portion is separable from the lower portion with the lower portion and a least a portion of the compensatory sealing layer remaining in contact with the container.

* * * * *